March 4, 1969 J. P. LABRECQUE 3,430,896
SHIMMY DAMPER

Filed May 2, 1967 Sheet 1 of 4

INVENTOR
JEAN P. LABRECQUE
BY Vernon F. Hauschild
ATTORNEY

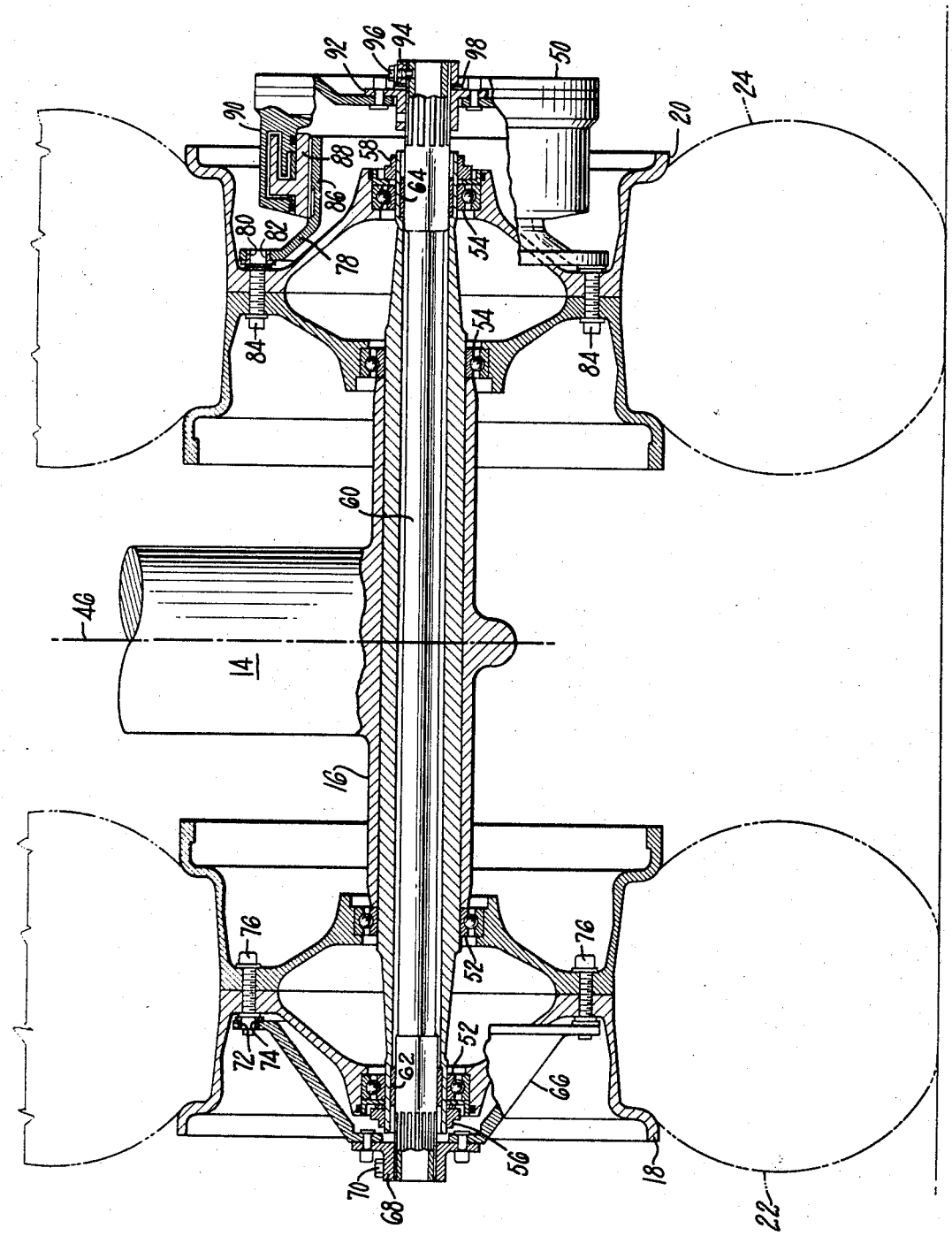

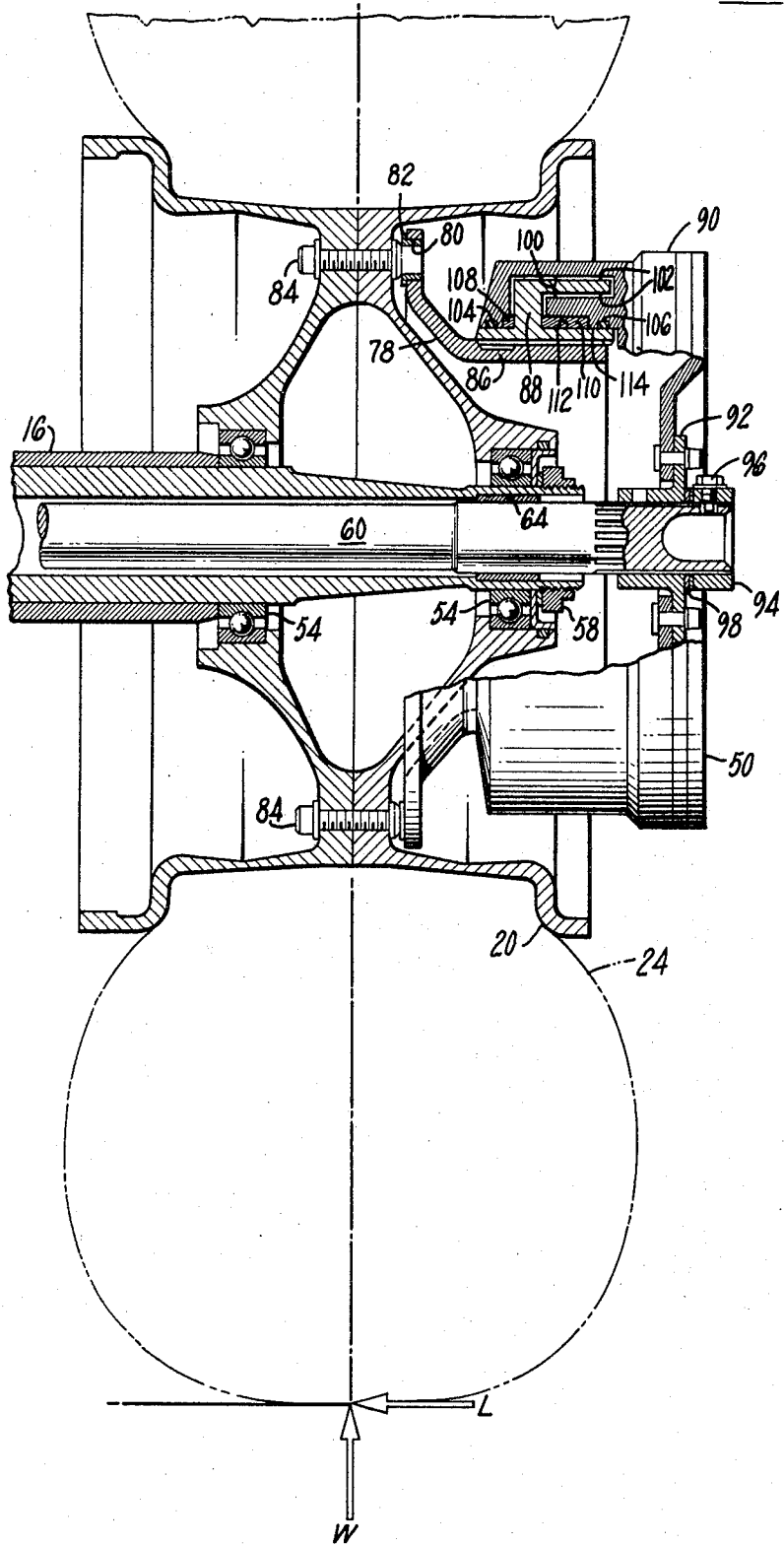

March 4, 1969  J. P. LABRECQUE  3,430,896
SHIMMY DAMPER

Filed May 2, 1967  Sheet 4 of 4

3,430,896
SHIMMY DAMPER
Jean P. Labrecque, Stratford, Conn., assignor to United Aircraft Corporation, East Hartford, Conn., a corporation of Delaware
Filed May 2, 1967, Ser. No. 635,437
U.S. Cl. 244—103            12 Claims
Int. Cl. B64c 25/36, 25/50

ABSTRACT OF THE DISCLOSURE

This disclosure relates to an improved shimmy damper for an aircraft landing gear which has dual wheels. The wheels are coupled together by a viscous damper which is easily installed or removed for servicing and which is attached to the wheels so that flexing of the wheels under load does not interfere with the operation of the closely spaced rotors of the viscous damper.

---

The invention herein described was made in the course of or under a contract or subcontract thereunder with the Department of the Navy.

Background of the invention

The invention relates to an improved viscous shimmy damper for an aircraft landing gear having dual wheels.

Wheel shimmy in a landing gear has plagued aircraft designers throughout the history of aircraft. The problem arises sometimes because of slope in worn out mounts or steering links, but very often occurs in new aircraft due to resonance of the landing gear and the airframe. This resonance may not be discovered until after a new aircraft is first flown and the design has been well established. Solving a resonance problem at this stage of the aircraft development is difficult.

Shimmy is the condition in which the landing gear wheels oscillate from side to side along a straight line parallel to the direction of travel. In heavier aircraft having dual wheels, each wheel tends to rotate with respect to the other while shimmying because the oscillation causes the wheels to move along the ground with different velocities at any instant in time. It is a well-known practice to rigidly fix the dual wheels together to eliminate shimmy. Coupling the wheels in this manner, of course, forces them to rotate at the same speed and to track along the straight line parallel to the direction of travel. Coupling the wheels in this manner, however, also causes extra wear on the tires due to scuffing and interferes with ground handling during which the wheels should rotate freely with respect to one another to execute turns. This interference is particularly noticed in the controls of a steerable gear.

Designs which strike a compromise between independently rotatable dual wheels and dual wheels fixed together have incorporated a friction-type clutch between the wheels which allows relative rotation of the wheels when the breakout torque of the clutch is exceeded during turns. An arrangement of this type is shown in U.S. Patent No. 2,620,235. The friction elements, however, are subject to wear and the break-out torque may be so reduced through wear that shimmy will work back into the system. It may also prove difficult to establish a break-out torque which will be large enough to prevent shimmying and yet will not be so large that it will substantially interfere with ground handling. Some degree of interference will inherently exist in any event.

A more appropriate design for the shimmy problem in castered landing gear incorporates a viscous damper between the rotatable and the non-rotatable portion of the landing gear strut. Since viscous forces increase as a function of velocity, the resistance offered by a viscous damper is more functionally suited to the high rotational velocities which occur during shimmy and the low rotational velocities which occur during turns. Such an arrangement is shown in U.S. Patent No. 2,661,915. In these designs, however, the loads resisting the shimmy motion must come through the non-rotatable portion of the strut from the airframe and consequently the airframe is still subjected to an undesirable vibratory load but at a reduced magnitude. The damper will also interfere with automatic centering devices which position the castered wheels before they are retracted. Additionally, a strut-mounted damper is not easily added to the aircraft once the landing gear design has been established.

Another solution incorporates a viscous damper to couple two landing gear wheels which are independently rotatable. An arrangement of this type is found in U.S. Patent No. 3,133,717. Such an arrangement restricts the high damping loads to the mechanism coupling the wheels. A rotary damper bolted to the wheels, however, experiences a portion of the high loads applied to the wheels during hard landings or landings in cross winds. The wheels will flex when subjected to these loads and the flexing will transmit some of the loads into the damper. A rotary damper has at least two rotors which move in close proximity to one another with a viscous fluid in between. The alignment and spacing of the rotors may be impaired by loads transmitted into the damper from the wheels. The spacing of the rotors for satisfactory damper performance is critical, and binding would severely interfere with the damping operation. Erratic behavior of the shimmy damper is most undesirable at the time when the wheels of the landing aircraft, travelling at a high speed, first make contact with ground. Unfortunately, it is also at this time that wheel loads are normally the highest. It, therefore, would be desirable to employ a rotary damper between the dual landing gear wheels without exposing the damper to these high landing loads.

Summary of invention

This invention teaches an improved shimmy damper which couples two landing gear wheels together by means of a rotary viscous damper and which will not transmit wheel loads through either the damper or the coupling apparatus. By coupling the wheels in this manner, the damping loads are not reacted through the landing gear strut into the airframe or steering linkage. Damping forces are generated while the wheel is shimmying and not during turns when the wheels must be free to rotate slowly with respect to one another. By eliminating the wheel loads from the rotary damper and the coupling apparatus, a much lighter assembly may be constructed and the operation of the rotary damper will not be impaired due to the misalignment of the rotative elements coupled through a viscous fluid.

The design basically incorporates a floating damping assembly which maintains torque-transmitting engagement with each of the wheels. If the wheels flex under load, the damping assembly is free to translate axially to accommodate the flexing wheel without losing the engagement with the wheel for torque transfer and without transmitting axial and radial forces or a bending moment into the damping assembly. By eliminating the hostile forces and bending moments from the damping assembly, reliability is improved.

It is another important feature of this invention that the damping assembly be easily fitted to an aircraft without modifying the basic landing gear design. This will permit the aircraft builder to design and fly the aircraft and incorporate the damping assembly, if necessary, after the landing gear design has been well established. In addition to being readily fitted to the aircraft, the shimmy damper can also be readily disassembled for servicing or repair without jacking or disassembling the landing gear or wheels. The ease of damper removal also minimizes interference with maintenance of the wheels.

The damping assembly employs a rotary damper with two viscously coupled rotors. Each rotor is connected for rotation to one of the wheels by means of a coupling which in one embodiment floats axially on a set of wheel lugs and which in another embodiment floats axially in cutouts in the wheel. The damper, therefore, operates in a rotating environment. To take advantage of the centrifugal field in this environment, the rotors employ several closely spaced cylindrical surfaces near the periphery of the viscous fluid chamber between the rotors. Reliability is enhanced by this construction since the centrifugal field will keep the fluid between these several cylindrical surfaces for viscous shearing action even though small amounts of the fluid are lost from the chamber.

*Brief description of the drawings*

FIG. 2 is a sectional view of the landing gear showing the installation of the damper between the wheels.

FIG. 3 is an enlarged view of one wheel showing the details of the damper and its mounting.

*Description of the preferred embodiments*

Figure 1:
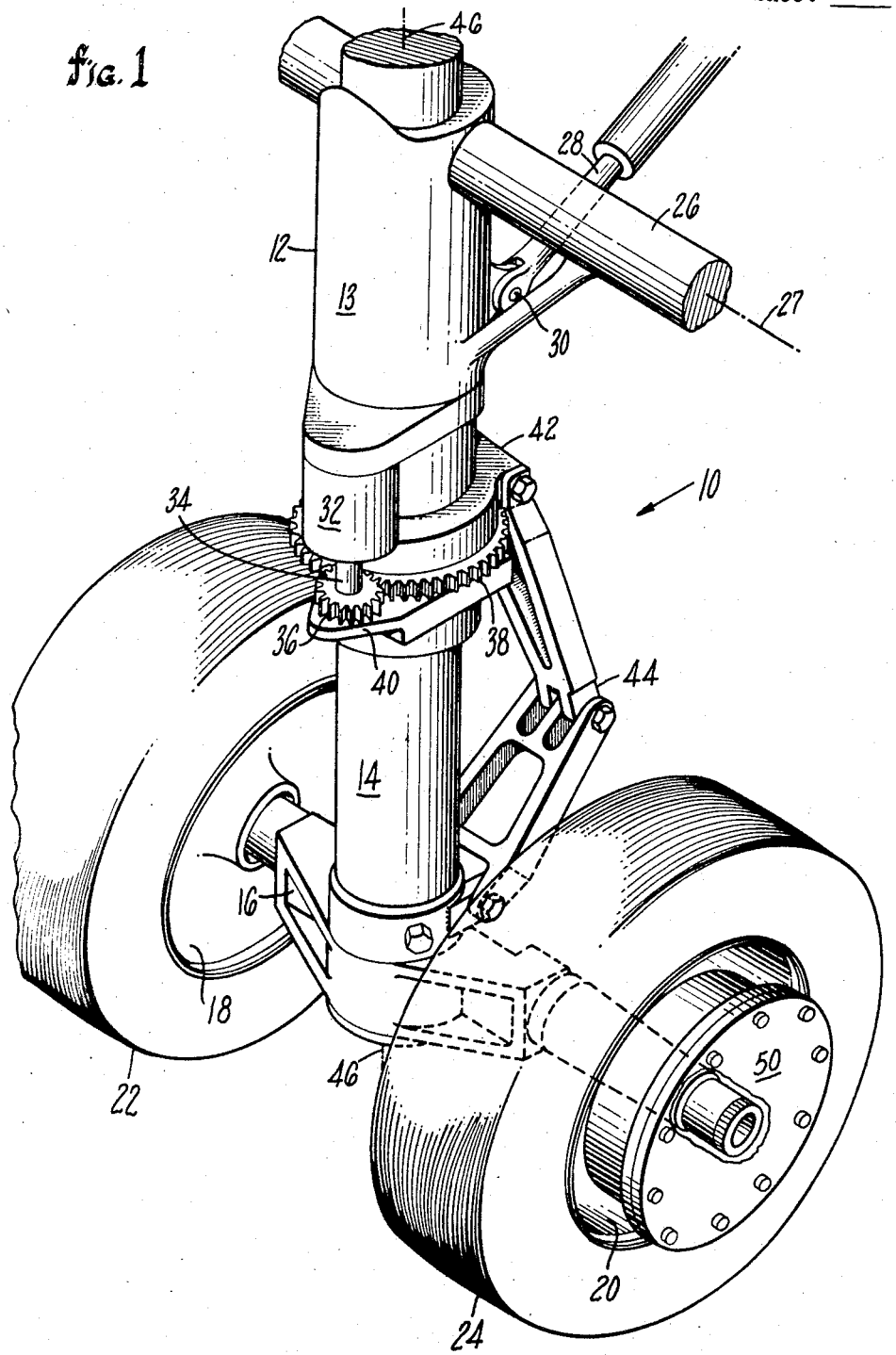
FIG. 1 is a view of a typical landing gear in which the shimmy damper is installed.

FIG. 1 shows a typical landing gear 10 in which the shimmy damping assembly can be incorporated. The landing gear has a strut assembly 12 which includes a cylinder 13 and an extendible piston 14. At the lower end of the piston 14 is a trailing axle 16 mounting dual wheels 18 and 20 having tires 22 and 24, respectively. The cylinder 13 and piston 14 may form an oleo damper within the strut assembly 12 in order to cushion "bounce" as the aircraft first makes contact with the ground. At the upper end of this strut assembly 12 is a trunnion 26 which is pivotally mounted along axis 27 within the airframe so that the landing gear 10 may be retracted. Retraction is accomplished by means of the drag strut 28 which is pivotally connected to the main strut 12 at 30.

This particular landing gear is of the steerable type; however, it should be pointed out that the incorporation of the shimmy damper is not limited to steerable landing gear. It is well known that shimmy may occur in a non-steerable landing gear just as well as in the steerable or castered gear. In order to provide steering control, a hydraulic motor 32 is rigidly fixed to the cylinder 13. The motor 32 has an output shaft 34 which is journalled in a bearing support 40 also fixed to the cylinder 13. A gear 36 is fixed to the output shaft 34 and drives a large ring gear 38 which is rigidly attached to a steering collar 42. The steering collar 42 is rotatably mounted on the cylinder 13 to operate in response to the motor 32. A scissors assembly 44 is connected at its upper end to the collar 42 and at its lower end to the lower end of the extendible piston 14 near the trailing axle 16. When power is applied to the steering motor 32, the gear 36 drives the ring gear 38 and steering collar 42. The torque imposed upon this steering collar 42 is transmitted through the scissors assembly 44 to swivel the piston 14 and wheels 18 and 20 about the axis 46 of the strut assembly. The scissors assembly 44 permits the extendible piston 14 to move in and out of the strut assembly 12 for damping "bounce" and at the same time, the assembly 44 transmits steering torque from motor 32. Mounted coaxially with the wheels 18 and 20 is a rotary damper 50 which is described below.

Referring to FIG. 2, a sectional view of the wheels 18 and 20 and the trailing axle 16 with the damper 50 installed is seen in greater detail. The trailing axle 16 is integrally connected with the lower end of extendible piston 14. This axle 16 is hollow, centered on the axis 46, and displaced rearwardly from the axis 46 to slightly trail the piston 14. The wheels 18 and 20 are mounted at the extremities of the axle by means of bearings 52 and 54 which are held in place by wheel nuts 56 and 58. The wheel nuts and the bearings fix both of the wheels 18 and 20 against axial displacement on the axle 16. With each wheel independently mounted on a set of bearings, the wheels can rotate with respect to one another and the axle 16. This facilitates ground handling during which the wheels must rotate with respect to one another for ease of turning and to prevent scuffing of the tires 22 and 24. A torque rod 60 is mounted on bushings 62 and 64 for rotation within the hollow axle 16. There are no shoulders on the torque rod 60 engaging the bushings 62 or 64 and, therefore, the rod 60 is free to translate axially within the axle 16 while the bushings 62 and 64 hold the torque rod 60 coaxial with the axle 16. The ends of the torque rod projecting from the axle 16 are splined. At the end of the torque rod 60, adjacent to the wheel 18 is a torque plate 66. This torque plate 66 has an internally splined collar 68 rigidly attached to the central portion of the plate 66. The splined collar 68 engages the splines of the torque rod 60 so that the torque rod 60 and plate 66 are fixed for rotation with one another. Threaded bolt 70 connects the collar 68 with the rod 60 in order to prevent the collar from disengaging the splines of the rod 60. A number of circumferentially spaced apertures 72 are located at the periphery of the torque plate 66. These apertures 72 contain bushings 74 and engage the wheel lugs 76. The lugs 76 are closely received by apertures 72 with the bushings 74 to cause the wheel 18 and the torque plate 66 to rotate together. This engagement of torque plate 66 and wheel 18, however, permits the torque plate 66 to be easily removed from the wheel for disassembly of the shimmy damper. Torque plate 66 together with the torque rod 60 are therefore fixed for rotation with the wheel but free to translate axially on the lugs 76. Although the lugs 76 in this case serve the additional function of holding each half of the wheel 18 together, an independent set of lugs may be used for engaging the torque plate 66 if desired.

A second torque plate 78 having peripherally spaced apertures 80 with bushings 82 is engaged with outwardly projecting wheel lugs 84 on wheel 20. The engagement of the torque plate 78 with the wheel 20 is identical to that of the torque plate 66 and wheel 18. The lugs 84 are closely received by the apertures 80 to cause the torque plate 78 to rotate with the wheel 20. The torque plate 78 is therefore fixed for rotation with the wheel 20 but free to be axially displaced outwardly from the wheel for disassembly.

The rotary damper 50 is composed of internal rotor 88 and external rotor 90 which are respectively connected to the torque plate 78 and the torque rod 60. The central portion of the torque plate 78 has a cylindrical section 86 which is externally splined. The internal rotor 88 also has splines which engage the splines of the cylindrical portion 86. The internal rotor 88, therefore, rotates with torque plate 78 and the wheel 20. The external rotor 90 of the damper 50 is rigidly fixed to an internally splined collar 92. The end of the torque rod 60 projecting from the axle 16 adjacent to the wheel 20 has splines engaging the collar 92. The external rotor 90 is therefore fixed for rotation with the torque rod 60. A retaining ring 94 is fixed to the torque rod 60 by means of bolt 96. The ring 94 and the collar 68 at the other end of the torque rod 60 cooperate to hold the torque plates 66 and 78 and the damper 50 in rotational engagement with the wheels 18 and 20. Interposed between the ring 94 and the collar 92 are a set of shims 98 which are selected to limit the axial translation of the entire damping assembly with respect to the wheels 18 and 20 as described below.

In order to fully understand why the rotary damper is permitted to float between the wheels, it will be necessary to understand the internal construction and operation of the rotary damper. Referring to the enlarged view of the wheel and damper in FIG. 3, the coacting parts of the rotary damper 50 will be seen. The external rotor 90 has an annular chamber defined in part by cylindrical surfaces 100. Projecting within this annular chamber is the second rotor 88 having cylindrical surfaces 102 in close proximity to the cylindrical surfaces 100. Seals 104 and 106 will confine a viscous fluid within the annular chamber between the rotors. As the internal rotor 88 rotates with respect to external rotor 90, the viscous fluid between these rotors will be placed in shear. In order to generate an efficient fluid coupling between the cylindrical surfaces 100 and 102, it is necessary that the spacing between these surfaces be quite small and generally in the order of .005". With the rotor 88 connected to one wheel and the rotor 90 connected to the other wheel, a viscous restraining torque is generated whenever the wheels attempt to rotate with respect to one another. When the wheels rotate with respect to one another at low speeds, this viscous restraining torque is very small and therefore ground maneuvers are accomplished with relative ease. When the wheels rotate at high velocity with respect to one another, as during shimmy, high viscous torques are generated which tend to cause the wheels to rotate together. This high velocity torque coupling the wheels together tends to damp wheel shimmy.

The cylindrical surfaces 100 and 102 are located near the periphery of the rotors with a portion of the viscous fluid chamber extending radially inward to the seals 104 and 106. A slight loss of fluid through the seals will not substantially interfere with damper performance because the centrifugal field at high speeds when damping is necessary forces the fluid outward between the cylindrical surfaces 100 and 102.

In order to keep the rotors 88 and 90 axially positioned with respect to one another, thrust rings 108 and 110 are positioned between the two rotors. The bearing surface 112 of the rotor 88 and the bearing surface 114 of rotor 90 rotate in contact with one another and hold the one rotor coaxial with the other so that surfaces 100 and 102 maintain their finite spacing. It will be understood, therefore, that the two rotors are fixed against displacement with respect to one another in both the axial and radial directions.

Having explained the construction and operation of the damper 50, it will be readily apparent that loads transmitted into the damper may adversely affect the damping operation. A high axial load will cause the thrust rings 108 and 110 to bear heavily against the rotors and increase the friction between the rotors, thereby reducing the purely viscous coupling desired. Additionally, bending moments transmitted through the bearing surfaces 112 and 114 will increase friction between the rotors and also strain the rotors thereby disturbing the finite spacing established between viscously coupled cylindrical surfaces 100 and 102. It is most desirable therefore to prevent the transmission of axial loads and bending moments through the rotary damper 50.

Landing gear wheels and tires as shown in FIG. 3 are subjected to vertical loads W arising from the gross weight of the aircraft and lateral loads L which occur during cross wind landings or whenever the wheel skids sideways as during shimmy. These loads are transmitted from the ground through the tire 24 and wheel 20 to the axle 16. The loads will cause the wheel to flex in the axial and radial directions in the region of the lugs. With a rotary damper rigidly fixed between the wheel and the torque rod, the flexing of the wheel could transmit a portion of the wheel loads through the damper as an axial load and a bending moment. This loading would cause the rotors to bear against one another and to lose their alignment. Such disturbances of the rotary damper will degrade damper performance. Unfortunately, the greatest wheel loads occur when the landing aircraft first touches down and this is the time that shimmy damping is most necessary.

It becomes readily apparent that a damping assembly which is free to float axially as disclosed is advantageous since the flexing of the wheel is simply accommodated by a corresponding axial translation of the torque plates and damper. The entire damping assembly spreads to the degree necessary to accommodate the cocked attitude of the flexing wheel. With the apertures 72 and 80 being permitted to translate axially upon the lugs 76 and 84, the torque plates 66 and 78 are free to displace slightly in the axial direction as the wheels assume the cocked position. The sliding connections between the torque plate 78 and the damper rotor 88 and between the torque rod 60 and damper rotor 90 permit the assembly to spread with the limits of the free play allowed by the shims 98. This free play must be limited in order to keep the torque plate apertures 72 and 80 engaged with the wheel lugs 76 and 84, respectively. The free play necessary to accommodate flexing of the wheels in a 40,000 pound aircraft has been set between .020–.060". Wheel lugs which project at least ¼" into the torque plates will easily accommodate this degree of free play without losing rotational engagement with the torque plates.

It will also be noted that the normal load W will cause the wheel 20 to flex in the radial direction in the vicinity of the lower lugs 84. This radial displacement of the lugs 84 could also increase the friction load between the bearing surfaces 112 and 114. It will be readily understood that this radial displacement of the lugs 84 can be accommodated by elongating the apertures 80 in torque plate 78 in the radial direction such that the apertures acquire an oval form. This extension of the apertures in the radial direction will not interfere with the tight rotational engagement of the wheel and torque plate since the parallel surfaces of the oval apertures 80 extending radially with respect to the wheel 20 will hold the plate 78 rotatably indexed with the wheel 20.

Figure 5:
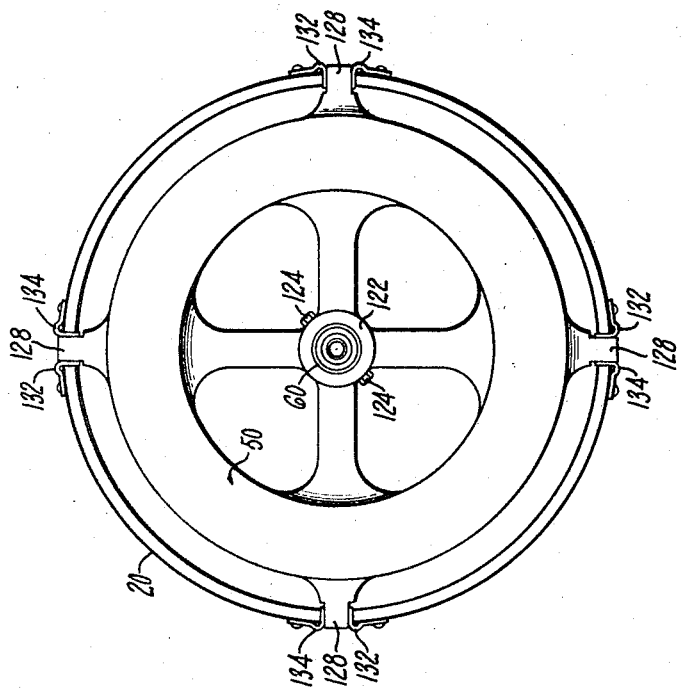
FIG. 5 is a side view of the wheel showing the alternate connection of the damper.
Figure 4:
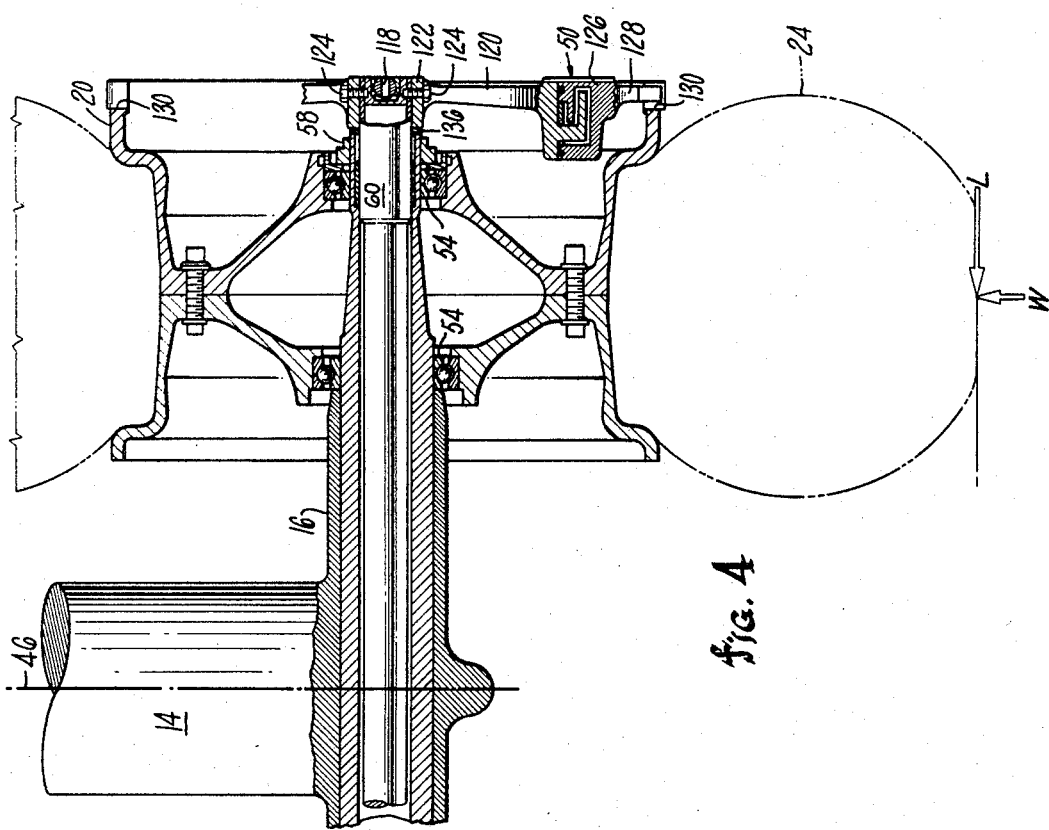
FIG. 4 is a sectional view of the wheel showing an alternate connection of the damper.

An alternate construction for the wheel and damper couplings inherently providing for both radial and axial flexing of the wheel with respect to the coupling is shown in FIGS. 4 and 5. In FIG. 4, the damper 50 has been slightly modified in that the inner rotor 120 is connected directly to the torque rod 60 by means of an integral collar 122 and set screws 124 also shown in FIG. 5. The set screws 124 also hold a bearing 118 in the end of the torque rod 60 to provide an attachment for a standard aircraft tow bar. The outer rotor 126 is modified by the addition of radially extending tangs 128 to form a rotational coupling. In order to provide for rotational engagement of the outer rotor 126, the rim of wheel 20 has a set of cutouts 130 which open outwardly from the wheel. As seen more clearly in FIG. 5, these cutouts are equally spaced around the rim. The tangs 128 from the rotor project within the cutouts to provide rotational engagement of the rotor 126 with the wheel 20. Reinforcing keys 132 and 134 are fixed to the wheel in order to protect the wheel cutouts 130 from damage and assure that the tangs 128 will be closely received by the cutouts 130 for positive rotational engagement. It will be readily understood that the coupling between the other end of the torque rod 60 and wheel 18, not shown, can be constructed with similar radially projecting tangs engaging similar cutouts in the rim of wheel 18.

It will be apparent from this construction that the shims 136 will limit the axial translation of the tangs 128 in the cutouts 130. Furthermore, when the wheel 20 flexes inwardly under the vertical load W, the tangs 128 will permit the wheel to flex in the radial direction without causing the two rotors 120 and 126 to bind. The coupling formed by the tangs isolates the damper 50 from axial and radial loads and bending moments that would be transmitted into the damper by a direct connection with the wheel.

It is to be understood that the invention is not limited to the particular embodiments shown and described. For instance, torque plate 66 could be rigidly fixed to the wheel 18 and the sliding connections of the torque plate 78 and rotary damper 50 would still permit sufficient free play for axial displacement of the damper 50 without transmitting bending loads from the wheel 20 to the damper 50. Also one of the connections to the damper could be fixed so long as the other connection permits the axial translation of the damper. Of course, the disadvantage of these arrangements would be that disassembly of the damping apparatus would not be quite as easy as that permitted by the disclosed embodiment. Secondly, additional provisions for rigidly fixing the torque plate 66 to the wheel 18 might require modification of the already existing wheel. As noted above, it is a significant advantage of the disclosed embodiments that the damping assembly can be installed without redesigning the landing gear. Furthermore, the installed damping assembly does not interfere with towing attachments for ground handling since the hollow ends of torque rod 60 or the bearing 118 can easily receive the attaching lugs of a standard aircraft tow bar.

I claim:
1. A floating shimmy damper for an aircraft landing gear having two independently rotatable wheels mounted on an axle comprising:
 (a) a first torque member;
 (b) first means for connecting the first torque member to one of the wheels for rotation therewith and for axial displacement with respect thereto;
 (c) a second torque member;
 (d) second means for connecting the second torque member to the other of the wheels for rotation therewith and for axial displacement with respect thereto;
 (e) a rotary damper having first and second rotatable elements coupled through a viscous fluid, the second rotatable element connected to the second torque member for rotation with the other of the wheels;
 (f) a torque-transmitting coupler connecting the first torque member to the first rotatable element of the damper; and
 (g) third means for limiting the axial displacement of the first and second torque members with respect to the wheels.

2. A shimmy damper for aircraft landing gear having dual wheels mounted for rotation with respect to one another on an axle comprising:
 (a) a first torque member adapted to engage the first of the dual wheels for rotation therewith and for movement in the axial direction with respect thereto;
 (b) a second torque member adapted to engage the second of the dual wheels for rotation therewith and for movement in the axial direction with respect thereto;
 (c) a rotary damper having a first rotatable element coupled through a viscous fluid with a second rotatable element, the second element being connected to the second torque member for rotation with the second of the dual wheels; and
 (d) an axially extending torque rod having one connection to the first torque member to fix the one end of the torque rod against rotation with respect to the first of the dual wheels, and having another connection to the first rotatable element of the damper to couple the other end of the torque rod through the damper and second torque member to the second of the dual wheels, the connections of the torque rod permitting limited movement of the first and second torque members in the axial direction with respect to the dual wheels.

3. A shimmy damper for an aircraft landing gear having first and second independently rotatable wheels mounted on a hollow axle comprising:
 (a) a torque rod extending through the hollow axle, one end of the torque rod being connected to the first wheel to rotate therewith;
 (b) a rotary damper having a first rotor viscously coupled with a second rotor, the first rotor mounted on the other end of the torque rod for rotation with the other end, the second rotor being adjacent to the second wheel, coaxial with the first rotor and fixed for axial movement with the first rotor; and
 (c) a torque-transmitting coupling interposed between and engaging the second wheel and the second rotor, the engagement with the second wheel fixing the coupling for rotation with the second wheel and permitting axial displacement of the coupling with respect to the wheel, the engagement with the second rotor fixing the rotor for rotation with the coupling and limiting the axial displacement of the coupling away from the second wheel.

4. Apparatus for damping shimmy in an aircraft landing gear having first and second independently rotatable and coaxial wheels comprising:
 (a) a first set of lugs projecting from one of the lateral sides of the first wheel;
 (b) a first torque-transmitting coupling adjacent to the one of the lateral sides of the first wheel and having openings into which the lugs are closely received for rotatably indexing the coupling and the first wheel, the openings providing rotational engagement of the first coupling and the first wheel and permitting axial flexing of the wheel with respect to the openings; and
 (c) a rotary damper having first and second rotors coupled through a viscous fluid, the first rotor being connected to the torque-transmitting coupling for rotation with the first wheel and the second rotor being connected for rotation with the second wheel whereby the flexing of the first wheel under load is accommodated by axial movement of the lugs within the openings to prevent binding of the first and second rotors.

5. Apparatus according to claim 4 wherein:
 (a) a second set of lugs project from the other of the lateral sides of the second wheel; and
 (b) the second rotor is connected to the second wheel through a second torque-transmitting coupling adjacent to the other of the lateral sides of the second wheel, the coupling having openings into which the lugs are closely received for rotatably indexing the coupling and the second wheel, the openings providing rotational engagement of the second coupling and second wheel and permitting axial flexing of the wheel with respect to the openings.

6. A shimmy damping assembly for an aircraft landing gear having a first wheel having a set of cutouts and a second wheel mounted coaxially with the first wheel for independent rotation with respect to the first wheel comprising:
 (a) a rotary damper positioned coaxially with and adjacent to the first wheel and having two rotational elements coupled by means of a viscous fluid, one element being connected to rotate with the second wheel; and
 (b) first coupling means connected to the other element of the damper and including a first set of tangs projecting into the cutouts of the first wheel, the outouts closely receiving the tangs for rotational engagement of the other element and the first wheel and permitting axial and radial flexing of the wheel with respect to each tang.

7. Apparatus according to claim 6 wherein:
 (a) the second wheel has a set of cutouts; and
 (b) the one element of the damper is connected to the second wheel through second coupling means having a set of tangs projecting into the cutouts of the second wheel, the cutouts closely receiving the tangs for rotational engagement of the other element and the second wheel and permitting axial and radial flexing of the wheel with respect to each tang.

8. A shimmy damper for an aircraft landing gear having independently mounted dual wheels with the outwardly facing wheel rims having spaced cutouts comprising:
 (a) first coupling means including radially projecting tangs closely received in the cutouts of the one wheel for rotating the first coupling means with the one wheel and permitting radial and axial displacement of the tangs within the cutouts as the one wheel flexes under load;
 (b) second coupling means including radially projecting tangs closely received in the cutouts of the other wheel for rotating the second coupling means with the other wheel and permitting radial and axial displacement of the tangs within the cutouts as the other wheel flexes under load;
 (c) a rotary damper having two rotors coupled by means of a viscous fluid, the one rotor being connected by the first coupling means for rotation with and translation with respect to the first wheel;
 (d) a torque rod having one end fixed to the other rotor of the damper for rotation and translation therewith and the other end fixed to the second coupling means for rotation and translation therewith, the torque rod permitting limited axial translation of the first coupling, the damper, and the second coupling with respect to the dual wheels.

9. In an aircraft landing gear having first and second wheels mounted for independent rotation on an axle, an improved shimmy damper comprising:
 (a) a first torque plate having a connection fixing the first torque plate against rotation with respect to the first wheel and permitting axial displacement of the first torque plate with respect to the first wheel;
 (b) a second torque plate having a connection fixing the second torque plate against rotation with respect to the second wheel and permitting axial displacement of the second torque plate with respect to the second wheel;
 (c) a damper having a first rotor coupled through a viscous fluid with a second rotor, the second rotor being connected to the second torque plate for rotation with the second wheel;
 (d) a torque-transmitting member connecting the first torque plate on the first wheel to the first rotor of the damper whereby the first and second wheels are coupled through the damper; and
 (e) means including the torque-transmitting member for limiting the axial displacement of the first and second torque plates with respect to the wheels.

10. In a landing gear having a pair of wheels mounted for independent rotation on a hollow axle, a floating shimmy damper comprising:
 (a) a rotary damper having two rotatable elements coupled by a viscous fluid and positioned adjacent to and coaxial with one of the wheels;
 (b) a torque rod extending through the hollow axle, one end of the torque rod being connected to one of the damper elements for rotation therewith;
 (c) a first set of lugs projecting outwardly from the one of the wheels;
 (d) a second set of lugs projecting outwardly from the other of the wheels;
 (e) a first torque member having radially elongated slots engaging the first set of lugs and connecting the other of the damper elements for rotation with the one of the wheels, the first torque member being free to translate laterally on the first set of lugs and permitting the lugs to move radially in the slots as the wheel flexes under load; and
 (f) a second torque member having radially elongated slots engaging the second set of lugs and connecting the torque rod and the one of the damper elements for rotation with the other of the wheels, the second torque member being free to translate laterally on the second set of lugs and permitting the lugs to move radially in the slots as the wheel flexes under load.

11. In an aircraft landing gear having first and second wheels mounted for independent rotation on a hollow axle connected to the aircraft, a shimmy damper comprising:
 (a) a torque rod extending through the hollow axle and projecting from each end of the axle;
 (b) a first torque plate adjacent to the first wheel and engaged with one end of the torque rod projecting from the axle for rotating the one end;
 (c) a first set of lugs projecting parallel to the axle from the first wheel, the first set of lugs engaging the first torque plate to permit the first torque plate to move freely in the axial direction with respect to the first wheel and to fix the first torque plate against rotation with respect to the first wheel;
 (d) a second torque plate adjacent to the second wheel;
 (e) a second set of lugs projecting parallel to the axle from the second wheel, the second set of lugs engaging the second torque plate to permit the second torque plate to move freely in the axial direction with respect to the second wheel and to fix the second torque plate against rotation with respect to the second wheel; and
 (f) a rotary damper having first and second rotatable elements coupled through a viscous fluid, the first element and the other end of the torque rod having a first connection preventing relative rotation of the first element with respect to the torque rod, the second element and the second torque plate having a second connection preventing relative rotation of the second element with respect to the second torque plate, at least one of the connections of the elements permitting limited displacement of the damper in the axial direction.

12. In an aircraft landing gear having a central strut attached at one end to the aircraft and supporting at the other end a hollow axle having first and second wheels mounted for independent rotation at each side of the central strut, the improvement comprising:
 (a) a torque rod extending through and axially displaceable within the hollow axle, the ends of the torque tube projecting outwardly from each end of the axle;
 (b) a first set of lugs projecting outwardly from the first wheel;
 (c) a second set of lugs projecting outwardly from the second wheel;

(d) a first coupling fixed for rotation and axial translation with the end of the torque rod adjacent to the first wheel and having apertures engaging the first set of lugs, the coupling being axially translatable on the lugs;
(e) a first rotor engaging the end of the torque rod adjacent to the second wheel for rotation therewith and limited axial translation thereon, the rotor having a cylindrical surface near the periphery of the rotor and coaxial with the axle;
(f) a second rotor axially fixed with respect to the first rotor and having a cylindrical surface confronting the cylindrical surface of the first rotor, the cylindrical surfaces defining a portion of an annular chamber between the rotors, the chamber being filled with a viscous fluid coupling the first rotor to the second rotor; and
(g) a second coupling interposed between the second rotor and the second wheel and connected to rotate the second rotor, the coupling having apertures engaging the outwardly projecting second set of lugs on the second wheel and being axially translatable on the second set of lugs, the axial translation of the couplings on their respective sets of lugs being limited by the connections of the torque rod, the first rotor and the second rotor thereby accommodating axial translation of the couplings to maintain the radial spacing of the cylindrical surfaces of the first and second rotors as the wheels flex under load.

References Cited

UNITED STATES PATENTS

| | | | |
|---|---|---|---|
| 2,602,612 | 7/1952 | Zimmerman et al. | 244—103 |
| 2,620,235 | 12/1952 | Butler | 244—103 |
| 3,133,717 | 5/1964 | Hartel | 244—103 |

FOREIGN PATENTS

| | | |
|---|---|---|
| 624,762 | 8/1961 | Canada. |
| 1,033,622 | 6/1966 | Great Britain. |

MILTON BUCHLER, *Primary Examiner.*

PAUL E. SAUBERER, *Assistant Examiner.*

U.S. Cl. X.R.

188—90